US012704765B2

(12) United States Patent
Gong et al.

(10) Patent No.: US 12,704,765 B2
(45) Date of Patent: Aug. 11, 2026

(54) MAGNETIC STRUCTURE OF VOICE COIL MOTOR, VOICE COIL MOTOR, ZOOM LENS AND PHOTOGRAPHIC EQUIPMENT

(71) Applicant: ZHONGSHAN UNION OPTECH RESEARCH INSTITUTE CO., LTD., Zhongshan (CN)

(72) Inventors: Junqiang Gong, Zhongshan (CN); Meijiao Zhao, Zhongshan (CN); Shengping Qiu, Zhongshan (CN); Kun Li, Zhongshan (CN); Minde Li, Zhongshan (CN); Hao Wang, Zhongshan (CN)

(73) Assignee: ZHONGSHAN UNION OPTECH RESEARCH INSTITUTE CO., LTD., Zhongshan (CN)

( * ) Notice: Subject to any disclaimer, the term of this patent is extended or adjusted under 35 U.S.C. 154(b) by 292 days.

(21) Appl. No.: 18/434,002

(22) Filed: Feb. 6, 2024

(65) Prior Publication Data

US 2024/0176210 A1 May 30, 2024

Related U.S. Application Data

(63) Continuation of application No. PCT/CN2023/131827, filed on Nov. 15, 2023.

(30) Foreign Application Priority Data

Nov. 15, 2022 (CN) ......................... 202211432023.0

(51) Int. Cl.
*G03B 5/04* (2021.01)
*H02K 41/035* (2006.01)

(52) U.S. Cl.
CPC ........... *G03B 5/04* (2013.01); *H02K 41/0354* (2013.01); *G03B 2205/0046* (2013.01); *G03B 2205/0069* (2013.01)

(58) Field of Classification Search
CPC .............. G03B 5/04; G03B 2205/0046; G03B 2205/0069; H02K 41/0354
(Continued)

(56) References Cited

U.S. PATENT DOCUMENTS 4,652,779 A * 3/1987 Wilcox .............. H02K 41/0358 310/27
5,202,595 A * 4/1993 Sim .................... H02K 41/0356 310/27
(Continued)

FOREIGN PATENT DOCUMENTS

CN 106842487 A 6/2017
CN 208399786 U 1/2019
(Continued)

OTHER PUBLICATIONS

JP-2022161138-A—Oct. 2022—Haruyama—JP—English.*
(Continued)

*Primary Examiner* — Sharrief I Broome
(74) *Attorney, Agent, or Firm* — Westbridge IP LLC

(57) ABSTRACT

Disclosed are a magnetic structure of a voice coil motor, a voice coil motor, a zoom lens and a photographic equipment. The magnetic structure of the voice coil motor is applied on a zoom lens and includes a yoke assembly and a magnetic stripe assembly; the yoke assembly includes two annular yoke bodies provided side by side in the first direction. The central axis of each annular yoke body is provided along the second direction. Each annular yoke body is extended along the third direction. The two annular yoke bodies are provided with two first yoke sections that are close to each other and two second yoke sections that are far away from each other in the first direction.

9 Claims, 2 Drawing Sheets

(58) Field of Classification Search
USPC .......................................................... 359/696
See application file for complete search history.

(56) References Cited

U.S. PATENT DOCUMENTS

| | | | |
|---|---|---|---|
| 2013/0120860 | A1 | 5/2013 | Sato |
| 2022/0244563 | A1 | 8/2022 | Lin et al. |

FOREIGN PATENT DOCUMENTS

| | | | | |
|---|---|---|---|---|
| CN | 115694119 | A | | 2/2023 |
| CN | 219107273 | U | | 5/2023 |
| JP | 2005012970 | A | | 1/2005 |
| JP | 2006081342 | A | | 3/2006 |
| JP | 2016122044 | A | | 7/2016 |
| JP | 2022161138 | A | * | 10/2022 |

OTHER PUBLICATIONS

First Office Action issued in counterpart Chinese Patent Application No. 202211432023.0, dated Sep. 10, 2025.

International Search Report and Written Opinion issued in corresponding PCT Application No. PCT/CN2023/131827, dated Jan. 24, 2024.

* cited by examiner

MAGNETIC STRUCTURE OF VOICE COIL MOTOR, VOICE COIL MOTOR, ZOOM LENS AND PHOTOGRAPHIC EQUIPMENT

CROSS-REFERENCE TO RELATED APPLICATIONS

The present application is a continuation application of International Application No. PCT/CN2023/131827, filed on Nov. 15, 2023, which claims priority to Chinese Patent Application No. 202211432023.0, filed on Nov. 15, 2022. The disclosures of the above-mentioned applications are incorporated herein by reference in their entireties.

TECHNICAL FIELD

The present application relates to the technical field of photographic equipment, in particular to a magnetic structure of a voice coil motor, a voice coil motor, a zoom lens and a photographic equipment.

BACKGROUND

Most of the existing zoom lenses are driven by voice coil motors (VCM) (VCM refers to the voice coil motor in electronics, which is a type of motor). The mover of the existing VCM is wound on a moving carrier, and the stator is yoke ring fixed in the lens barrel. The existing yoke ring is a circular ring set outside the coil, and the magnet ring is set inside the yoke ring. When the zoom lens is used for smaller photographic equipment, the VCM motor used has low magnetic field strength and small driving force; at the same time, on the premise of meeting the driving force demand, thickened and widened magnets and yokes need to be used, which increases the size of the zoom lens and increases production costs.

SUMMARY

The main purpose of the present application is to provide a magnetic structure of a voice coil motor, a voice coil motor, a zoom lens and a photographic equipment, aiming to solve the problem of low magnetic field strength and small driving force of the existing VCM, and the problem of large size and high cost of the existing VCM that meets the driving force requirements.

In order to achieve the above purpose, the present application provides a magnetic structure of a voice coil motor, applied to a zoom lens, including:

a yoke assembly provided with two annular yoke bodies provided side by side in a first direction; a central axis of each of the annular yoke bodies is provided along a second direction, and each of the annular yoke bodies is configured to extend along a third direction; the two annular yoke bodies are provided with two first yoke sections that are close to each other in the first direction, and two second yoke sections that are far away from each other; and a magnetic strip assembly provided with two magnets; the two magnets are respectively provided in the two annular yoke bodies; the two magnets are respectively provided on opposite side end surfaces of the two first yoke sections, or opposite side end surfaces of the two second yoke sections.

In an embodiment, the yoke assembly includes:

two yokes; each of the two yokes is provided with a first straight yoke section, a second straight yoke section and an arc-shaped yoke section; the first straight yoke section and the second straight yoke section are provided opposite to each other in the first direction, and two ends of the first straight yoke section and the second straight yoke section are connected by the arc-shaped yoke section in the third direction; the first straight yoke section of one yoke and the second straight yoke section of the other yoke are configured snugly; and a yoke cover configured to extend along the first direction and connect the other two ends of the first straight yoke section and the second straight yoke section of each of the yokes in the third direction in order to respectively surround to form the two annular yoke bodies;

the two magnets are respectively provided on the first straight yoke section and the second straight yoke section that are configured snugly or are respectively provided on the first straight yoke section and the second straight yoke section that are far away from each other; the two first yoke sections are provided with a first straight yoke section and a second straight yoke section that are configured snugly, and the two second yoke sections are provided with a first straight yoke section and a second straight yoke section that are far away from each other.

In an embodiment, the two yokes are provided with a first yoke and a second yoke; the first straight yoke section of the first yoke and the second straight yoke section of the second yoke are configured snugly, and the first straight yoke section of the second yoke is provided with a mounting portion at the other end in the third direction; and the yoke cover is detachably mounted on the mounting portion to sequentially connect the first straight yoke section and the second straight yoke section of the first yoke and the first straight yoke section and the second straight yoke section of the second yoke.

In an embodiment, the first straight yoke section of the second yoke is provided with a snap-in slot at the other end in the third direction; and one end of the yoke cover is provided with a snap-in protrusion, and the snap-in protrusion is engaged in the snap-in slot; the other end of the yoke cover is configured to extend transversely to the the other end of the second straight yoke section provided on the first yoke in the third direction;

the mounting portion includes the snap-in slot.

In an embodiment, in the third direction, the other two ends of the first straight yoke section of the first yoke and the second straight yoke section of the second yoke are respectively provided with two positioning grooves; and the yoke cover is provided with two positioning posts, and the two positioning posts are configured to correspond to the two positioning grooves one by one, so that when the yoke cover is mounted on the first yoke and the second yoke, the two positioning posts are correspondingly inserted into the two positioning grooves.

In an embodiment, the magnetic structure of the voice coil motor further includes:

a detachable connection structure provided with a through hole, a thread locking hole and a locking screw;

a thread end of the locking screw is passed through the through hole and threadedly provided in the thread locking hole; and the through hole is provided on the yoke cover, and the thread locking hole is correspondingly provided on the other end of the second straight yoke section of the first yoke in the third direction.

In an embodiment, each of the magnets includes a magnetic strip, the magnetic strip is configured to extend along the third direction and is fixedly connected to the two first yoke sections or the two second yoke sections through a thread connection structure.

The present application also provides a voice coil motor, applied to a zoom lens, including:

the magnetic structure of the voice coil motor; and an annular coil provided on a movable bearing plate of the zoom lens;

the annular coil is wound along an extension axis in the third direction; the two first yoke sections of the magnetic structure of the voice coil motor that are in contact with each other in the first direction are provided in the annular coil.

The present application also provides a zoom lens, including the voice coil motor.

The present application also provides a photographic equipment, including the zoom lens.

In the technical solution of the present application, the magnetic structure of the voice coil motor includes a yoke assembly and a magnetic stripe assembly; the yoke assembly includes two annular yoke bodies provided side by side, and the two annular yoke bodies are provided with two first yoke sections that are close to each other, and two second yoke sections that are far away from each other in the first direction. Two magnets are respectively provided on the opposite side end surfaces of the first yoke section or on the opposite side end surfaces of the second yoke section; that is to say, when the coil is energized, a permanent magnetic field is generated, and by changing the DC current of the coil in the motor, the electrical energy is converted into mechanical energy to drive the movable bearing plate provided with the coil to move. Because the movable bearing plate is used for the installation of the zoom lens, it can also drive the zoom lens to move and realize the driving operation. At the same time, because this solution uses two annular yokes and two magnets, it can generate strength a higher magnetic field to produce a greater driving force, which means that while providing the same driving force, the magnet volume requirement of this solution is small, and the yoke volume requirement is small. In this way, the volume of the magnetic structure of the voice coil motor can be reduced and the space occupied by the magnetic structure of the voice coil motor can also be reduced, thereby reducing the volume of the voice coil motor and the zoom lens; and, since the size of the magnet and the yoke used is small, the production cost of the voice coil motor and the zoom lens can be reduced.

BRIEF DESCRIPTION OF THE DRAWINGS

In order to illustrate the embodiments of the present application or the technical solutions in the related art more clearly, the drawings needed to be used in the description of the embodiments or the related art will be briefly introduced below. Obviously, the drawings in the following description are only some embodiments of the present application. For those skilled in the art, other drawings can be obtained based on the structures shown in these drawings without exerting creative efforts.

Figure 1:
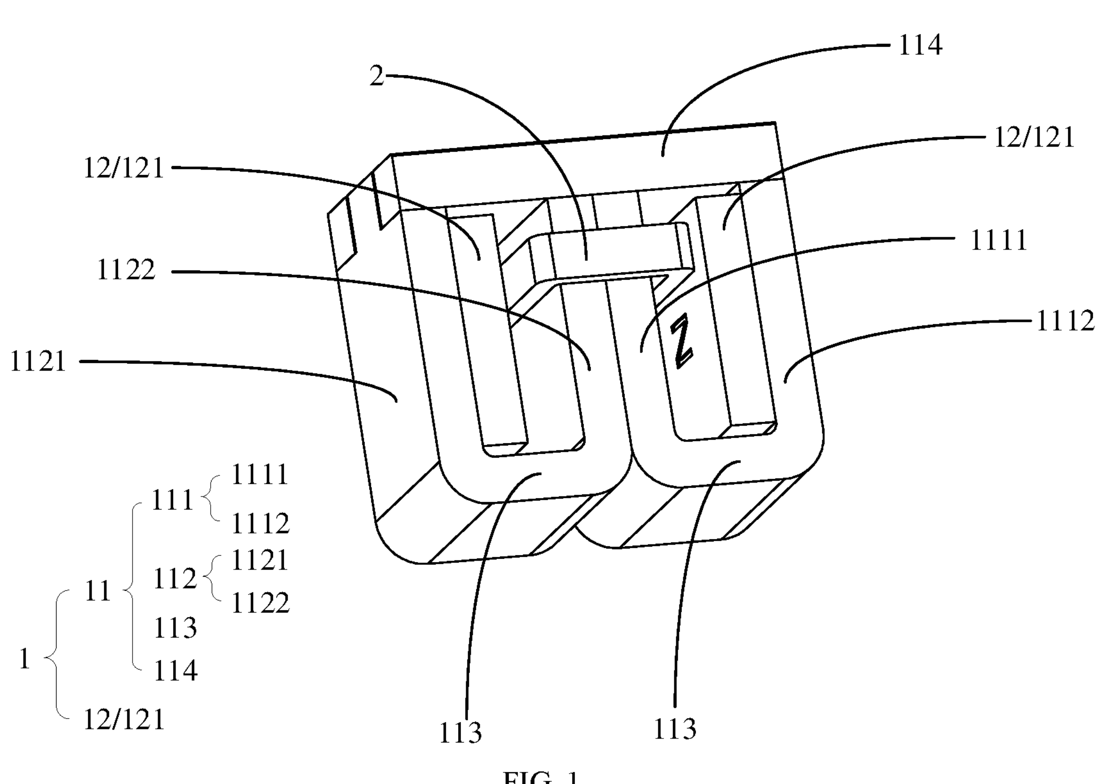
FIG. 1 is a schematic assembly diagram of a voice coil motor according to a first embodiment of the present application.
Figure 1:
Figure 2:
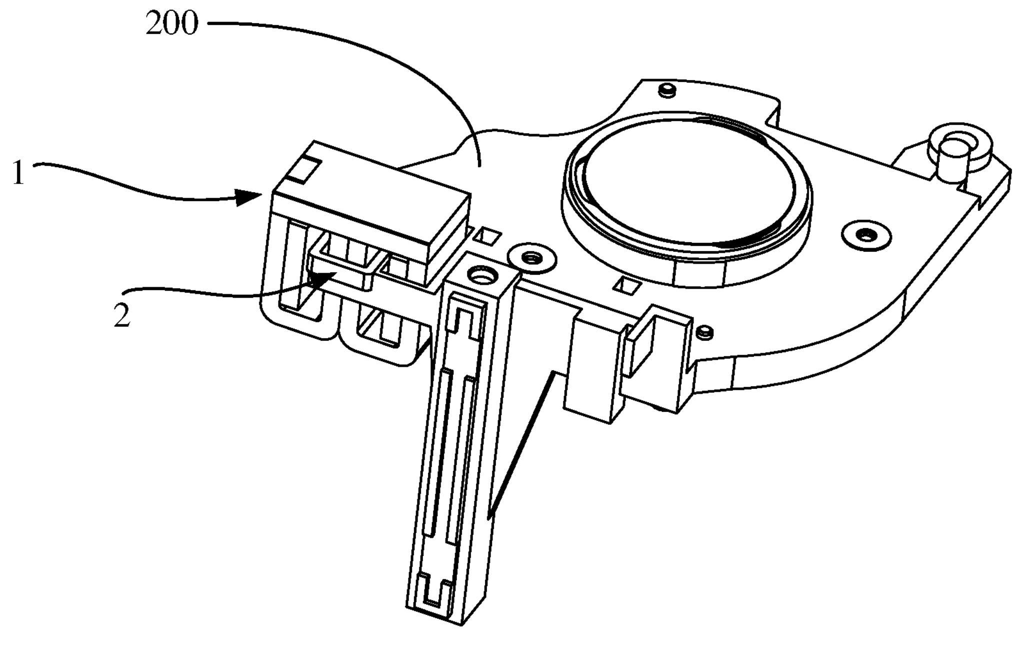
FIG. 2 is a schematic three-dimensional structural diagram of the first embodiment of the voice coil motor (mounted on the movable bearing plate) in FIG. 1.

The realization of the purpose, functional features and advantages of the present application will be further described with reference to the embodiments and the accompanying drawings.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only some of the embodiments of the present application, rather than all of the embodiments. Based on the embodiments in the present application, all other embodiments obtained by those skilled in the art without creative efforts fall within the protection scope of the present application.

It should be noted that if there are directional indications involved in the embodiments of the present application, the directional indications are only used to explain the relative positional relationship, movement, etc. between the assemblies in a specific posture. If the specific posture changes, the directional indications will also change accordingly.

In addition, if there are descriptions involving "first", "second", etc. in the embodiments of the present application, the descriptions of "first", "second", etc. are only for descriptive purposes and shall not be understood as indicating or implying their relative importance or implicitly indicating the number of indicated technical features. Therefore, features defined as "first" and "second" may explicitly or implicitly include at least one of these features. In addition, the technical solutions in various embodiments can be combined with each other, but it must be based on the realization by those skilled in the art. When the combination of technical solutions is contradictory or cannot be realized, it should be considered that such a combination of technical solutions does not exist, nor within the protection scope required by the present application.

Most of the existing zoom lenses are driven by VCM motors (VCM (Voice Coil Motor) refers to the voice coil motor in electronics, which is a type of motor). The mover of the existing VCM motor is the coil wound outside a moving carrier. The stator are yoke rings fixed in the lens barrel. The existing yoke ring is a circular ring set outside the coil, and the magnet ring is set inside the yoke ring. When the zoom lens is used for smaller photographic equipment, the VCM used has low magnetic field strength and small driving force; at the same time, on the premise of meeting the driving force demand, thickened and widened magnets and yokes need to be used, which increases the size of the zoom lens and increases production costs.

In view of this, the present application provides a magnetic structure of a voice coil motor, a voice coil motor, a zoom lens and a photographic equipment. FIGS. 1 to 4 show specific embodiments of the voice coil motor provided by the present application.

Please refer to FIGS. 1 to 4, the magnetic structure 1 of the voice coil motor is used on a zoom lens. The magnetic structure 1 of the voice coil motor includes a yoke assembly 11 and a magnetic stripe assembly 12; the yoke assembly 11 includes two annular yoke bodies provided side by side in the first direction F1. The central axis of each annular yoke body is provided along the second direction F2. Each of the annular yoke bodies is extended along the third direction F3. Two annular yoke bodies are provided with two first yoke sections 111 that are close to each other in the first direction F1, and two second yoke sections 112 that are far away from each other; the magnetic strip assembly 12 includes two magnet 121, two magnets 121 are respectively located in the two annular yoke bodies, and the two magnets 121 are respectively located on the opposite side end surfaces of the two first yoke sections 111 or on the opposite side end surfaces of the two second yoke 112.

In the technical solution of the present application, the magnetic structure 1 of the voice coil motor includes a yoke assembly 11 and a magnetic strip assembly 12; the yoke assembly 11 includes two annular yoke bodies provided side by side, and the two annular yoke bodies are provided with two first yoke sections 111 that are close to each other in the first direction F1, and two second yoke sections 112 that are far away from each other. Two magnets 121 are respectively provided on the opposite side end surfaces of the two first yoke sections 111 or on the opposite side end surfaces of the two second yoke sections 112; that is to say, when the coil is energized, a permanent magnetic field is generated, which changes the DC current of the coil in the motor. The magnitude of the current converts electrical energy into mechanical energy, and drives the movable bearing plate 200 provided with the coil to move. Because the movable bearing plate 200 is used for installing the zoom lens, it can also drive the zoom lens to move and realize the driving operation; at the same time, because this solution uses two annular yokes and the two magnets 121, it can generate a magnetic field with higher intensity, thereby generating a greater driving force. This means that while providing the same driving force, the magnet 121 of this solution requires a small volume, and the volume of the yoke is small. In this way, the volume of the magnetic structure 1 of the voice coil motor can be reduced, which also reduces the occupied space of the magnetic structure 1 of the voice coil motor, thereby reducing the volume of the voice coil motor 100 and the zoom lens; and because the magnet 121 and the yoke are smaller in size, the production cost of the voice coil motor 100 and the zoom lens can be reduced.

It should be noted that the annular yoke body can be composed of multiple yoke sections assembled, but the number of yoke sections of each annular yoke body is not limited in the present application.

Figure 3:
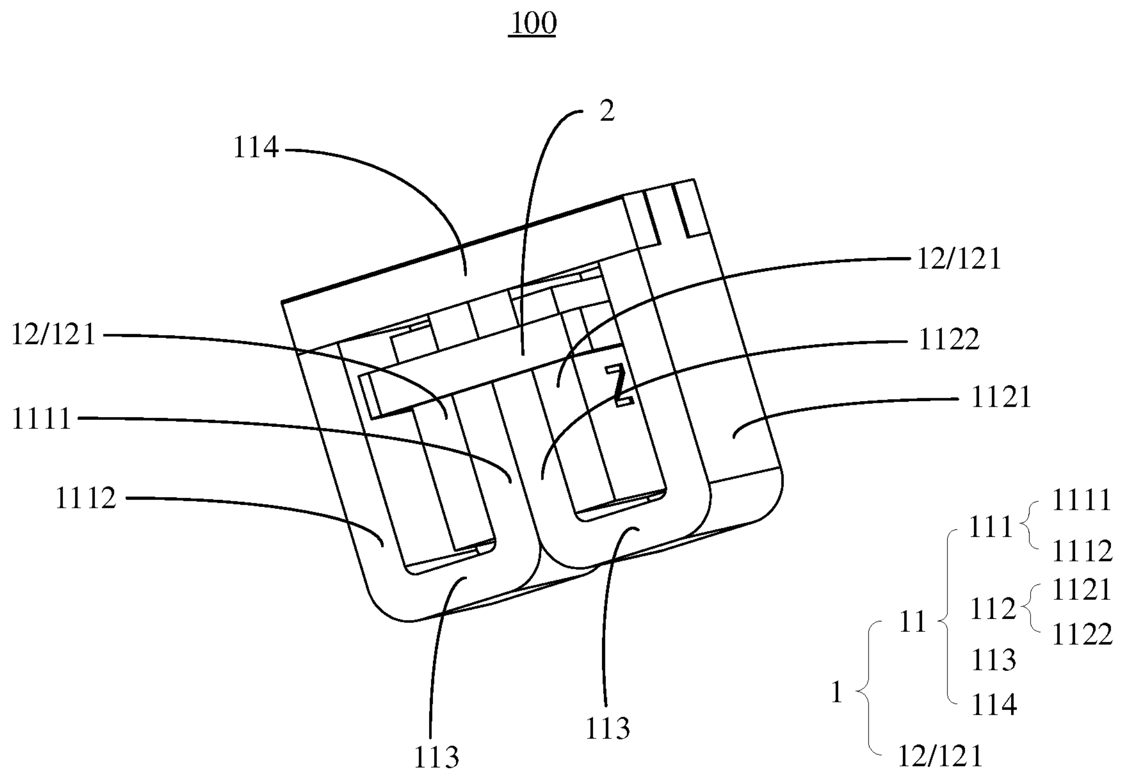
FIG. 3 is a schematic assembly diagram of the voice coil motor according to a second embodiment of the present application.
Figure 4:
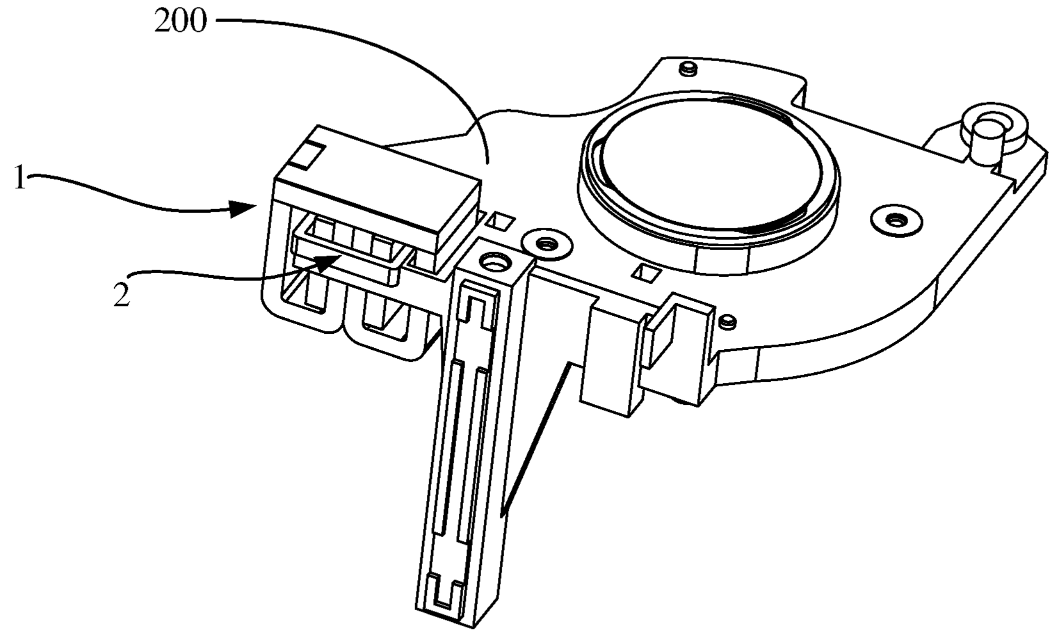
FIG. 4 is a schematic three-dimensional structural diagram of the second embodiment of the voice coil motor (mounted on the movable bearing plate) in FIG. 3.

Specifically, please refer to FIGS. 1 and 3, the yoke assembly 11 includes two yokes and a yoke cover 114; among the two yokes, each yoke includes a first straight yoke section, a second straight yoke section and an arc-shaped yoke section 113; the first straight yoke section and the second straight yoke section are provided oppositely in the first direction F1. Two ends of the first straight yoke section and the second straight yoke section are connected by the arc-shaped yoke section 113 in the third direction F3, in which the first straight yoke section of one yoke and the second straight yoke section of the other yoke are provided in close contact; The yoke cover 114 extends along the first direction F1 to sequentially connect the other two ends of the first straight yoke section and the second straight yoke section of each yoke in the third direction F3, so as to enclose and form the two annular yoke bodies respectively; the two magnets 121 are respectively provided on the first straight yoke section and the second straight yoke section that are close to each other or are separately provided on the first straight yoke section and the second straight yoke section that are far away from each other. The two first yoke sections 111 include the first straight yoke section and the second straight yoke section that fit each other. Correspondingly, the two second straight yoke sections 112 include a first straight yoke section and a second straight yoke section that are far away from each other; in this embodiment, the yoke assembly 11 includes two yokes, and the two yokes and the yoke cover 114 together enclose and form two annular yoke bodies. This arrangement facilitates the disassembly and assembly of the annular yoke bodies. At the same time, the first straight yoke section and the second straight yoke section extending along the third direction F3 provide a moving space for the coil so as to meet the zooming requirements of the zoom lens.

At the same time, in this embodiment, the two yokes include a first yoke 111 and a second yoke 112, a first straight yoke section 1111 of the first yoke and a second straight yoke section 1122 of the second yoke are provided in close contact, and the first straight yoke section 1121 of the second yoke is provided with a mounting portion at the other end in the third direction F3; the yoke cover 114 is detachably provided on the mounting portion. The mounting portion is used to sequentially connect the first straight yoke section 1111 and the second straight yoke section 1112 of the first yoke and the first straight yoke section 1121 and the second straight yoke section 1122 of the second yoke; by providing the mounting portion, the installation of the yoke cover 114 is more convenient and stable.

Specifically, the first straight yoke section 1121 of the second yoke is provided with a snap-in slot at the other end in the third direction F3; the yoke cover 114 is provided with a snap-in protrusion at one end, and the snap-in protrusion is locked in the snap-in slot; and the other end of the yoke cover 114 extends transversely to extend to the other end of the second straight yoke section 1112 erected on the first yoke in the third direction F3; the mounting portion includes the snap-in slot; in this way, the snap-in slot can not only snap-fix the yoke cover 114, so that the installation of the yoke cover 114 is more stable. At the same time, the snap-in slot can also be used as a positioning structure to make the installation of the yoke cover 114 smoother and can be provided in place at one time, thereby improving assembly efficiency.

More specifically, in the third direction F3, the other two ends of the first straight yoke section 1111 of the first yoke and the second straight yoke section 1122 of the second yoke are respectively provided with two positioning grooves; the yoke cover 114 is provided with two positioning posts, and the two positioning posts correspond to the two positioning grooves one by one, so that when the yoke cover 114 is provided on the first yoke 111 and the second yoke 112, the two positioning posts can be inserted into the two positioning grooves respectively; by providing the positioning grooves and the positioning posts, not only this can make the assembly of the yoke cover 114 smoother, but also the yoke cover 114 can be further limited, thereby making the installation of the yoke cover 114 more stable.

The present application does not limit the specific fixing method of the yoke cover 114. In some embodiments, the yoke cover 114 can be adhered to the first straight yoke section 1111 and the second straight yoke section of the first yoke and the first straight yoke section 1121 and the second straight yoke section of the second yoke through optical glue.

In another embodiment, in order to further improve the installation stability of the yoke cover 114 and ensure that the yoke cover 114 is easy to disassemble and assemble, the magnetic structure 1 of the voice coil motor also includes a detachable connection structure. The detachable connection structure includes a through hole, a thread locking hole and a locking screw, the thread end of the locking screw passes through the through hole and is threadedly provided in the thread locking hole; the through hole is provided in the yoke cover 114, and the thread locking hole is correspondingly provided in the other end of the second straight yoke section 1112 of the first yoke in the third direction F3; thus, not only the installation stability of the yoke cover 114 can be improved; moreover, fixing the yoke cover 114 by screw fastening also makes the disassembly and assembly of the yoke cover 114 more convenient.

It should be noted that the present application does not limit the specific form of the magnet 121. The magnet 121 can be a whole magnetic strip, or formed by multiple magnetic blocks spliced together.

Specifically, in this embodiment, each of the magnets 121 includes a magnetic strip, which extends along the third direction F3 and is fixedly connected to two first yoke 111 sections or two second yoke 112 sections through a thread connection structure. Such an arrangement not only has a simple structure and high assembly efficiency, but also makes the disassembly and assembly of the magnetic strip more convenient.

The present application also provides a voice coil motor 100, which includes the above-mentioned magnetic structure 1 of the voice coil motor. The voice coil motor 100 includes all the technical features of the above-mentioned magnetic structure 1 of the voice coil motor, and therefore also has all the above-mentioned technical features. The technical effects brought about will not be repeated here.

The voice coil motor 100 also includes an annular coil 2. The annular coil 2 is used to be provided on the movable bearing plate 200 of the zoom lens. The annular coil 2 is wound along the extension axis of the third direction F3; the two first yoke 111 sections of the magnetic structure 1 of the coil motor that are attached to each other in the first direction F1 are inserted into the annular coil 2; that is to say, when the annular coil 2 is energized, a permanent magnetic field is generated; the permanent magnetic field converts electrical energy into mechanical energy by changing the DC current of the coil in the motor, thereby driving the movable bearing plate 200 provided on the annular coil 2 to move. Because the movable bearing plate 200 is used for installing the zoom lens, so it can also drive the zoom lens to move and realize the driving operation.

The present application also provides a zoom lens, including the above-mentioned voice coil motor 100. The zoom lens includes all the technical features of the above-mentioned voice coil motor 100. Therefore, it also has the technical effects brought by all the above-mentioned technical features, which will not be discussed here.

The zoom lens also includes a lens housing and a movable bearing plate 200. The lens housing is formed with a cavity, and the cavity is provided with an opening on the axial side wall of the opening. The movable bearing plate 200 is movably provided in the cavity from the opening along the axial direction of the opening. The movable bearing plate 200 is used for mounting the zoom lens; the annular coil 2 is provided on the movable bearing plate 200 and is wound along the axis extending axially of the opening. The magnetic structure 1 of the voice coil motor is fixed on the inner wall of the cavity and at least partially penetrates the annular coil 2.

When the annular coil 2 is energized, a permanent magnetic field is generated, which converts electrical energy into mechanical energy by changing the DC current of the coil in the motor, driving the movable bearing plate 200 for the annular coil 2 to move. Because the movable bearing plate 200 is used for the installation of the zoom lens, so that the movable bearing plate 200 is movable and provided in the cavity along the axial direction of the opening, so as to drive the movement of the zoom lens to achieve fast focusing speed, high focusing accuracy and low power consumption, and low noise. At the same time, because the magnetic structure is fixed in the cavity of the lens housing, the voice coil motor 100 assembly is a built-in structure after the camera equipment is assembled, and the voice coil motor 100 assembly cannot be seen from the outside, which solves the problem in the related art that the voice coil motor 100 used to drive the zoom lens is externally provided, resulting in a larger volume of the camera equipment.

In order to make the movable bearing plate 200 move smoothly, a second guide structure is provided between the movable bearing plate 200 and the lens housing. The second guide structure includes a guide rod extending axially along the opening and a guide hole matching the guide rod. The guide rod is provided in the cavity, and the guide hole is provided in the movable bearing plate 200. In this arrangement, the guide rod and the guide hole cooperate with each other, so that the movable bearing plate 200 can move smoothly along the axial direction of the opening.

The yoke assembly 11 is detachably connected to the inner wall of the cavity. This arrangement facilitates replacement of the yoke assembly 11.

There are many ways to realize the detachable connection between the yoke assembly 11 and the inner wall of the cavity. For example, the yoke assembly 11 and the inner wall of the cavity are fixed by buckles. Specifically, in the embodiment of the present application, the inner wall of the cavity is provided with a first thread hole, and a screw connector is inserted into the first thread hole. The outer surface of the second straight yoke section 1122 of the second yoke and/or the side wall surface of the arc-shaped yoke section 113 is provided with a second thread hole corresponding to the first thread hole, and the second thread hole is threaded with the thread end of the thread member. In this way, a detachable connection between the yoke assembly 11 and the inner wall of the cavity is realized.

In order to accurately install the yoke assembly 11, a positioning structure is provided between the yoke assembly 11 and the lens housing. The positioning structure includes a positioning part and a mating part that matches the positioning part. Between the positioning part and the mating part, one of them is provided on the yoke assembly 11 and the other is provided on the lens housing. With this arrangement, the positioning part and the mating part cooperate with each other, so that the yoke assembly 11 can be accurately provided in the lens housing cavity.

Specifically, in the embodiment of the present application, the positioning part is provided on the lens housing, and the positioning part is configured as a positioning rod; the mating part is provided on the yoke assembly 11, and the mating part is configured as a positioning hole. By inserting the positioning rod into the positioning hole, the yoke assembly 11 can be accurately provided.

The present application also provides a photographic device, including the above-mentioned zoom lens. The photographic device includes all the technical features of the above-mentioned zoom lens. Therefore, it also has the technical effects brought by all the above-mentioned technical features, which will not be described again here.

The above are only some embodiments of the present application, and are not intended to limit the patent scope of the present application. Under the concept of the present application, any equivalent structural transformation made by using the contents of the description and drawings of the present application, or directly/indirectly applied in other related technical fields, are all included in the patent scope of the present application.

What is claimed is:

1. A magnetic structure of a voice coil motor, applied to a zoom lens, comprising:

a yoke assembly provided with two annular yoke bodies provided side by side in a first direction; wherein a central axis of each of the annular yoke bodies is provided along a second direction, and each of the annular yoke bodies is configured to extend along a third direction; the two annular yoke bodies are provided with two first yoke sections that are close to each other in the first direction, and two second yoke sections that are far away from each other; and a magnetic strip assembly provided with two magnets; wherein the two magnets are respectively provided in the two annular yoke bodies; the two magnets are respectively provided on opposite side end surfaces of the two first yoke sections, or opposite side end surfaces of the two second yoke sections, wherein each of the magnets comprises a magnetic strip, the magnetic strip is configured to extend along the third direction and is fixedly connected to the two first yoke sections or the two second yoke sections through a thread connection structure.

2. The magnetic structure of the voice coil motor according to claim 1, wherein the yoke assembly comprises:

two yokes; wherein each of the two yokes is provided with a first straight yoke section, a second straight yoke section and an arc-shaped yoke section; the first straight yoke section and the second straight yoke section are provided opposite to each other in the first direction, and two ends of the first straight yoke section and the second straight yoke section are connected by the arc-shaped yoke section in the third direction; the first straight yoke section of one yoke and the second straight yoke section of the other yoke are arranged in close contact with each other; and a yoke cover configured to extend along the first direction and connect the other two ends of the first straight yoke section and the second straight yoke section of each of the yokes in the third direction in order to respectively surround to form the two annular yoke bodies;

wherein, the two magnets are respectively provided on the first straight yoke section and the second straight yoke section that are in close contact with each other or are respectively provided on the first straight yoke section and the second straight yoke section that are far away from each other; the two first yoke sections are provided with a first straight yoke section and a second straight yoke section that are in close contact with each other, and the two second yoke sections are provided with a first straight yoke section and a second straight yoke section that are far away from each other.

3. The magnetic structure of the voice coil motor according to claim 2, wherein the two yokes are provided with a first yoke and a second yoke; the first straight yoke section of the first yoke and the second straight yoke section of the second yoke are arranged in close contact with each other, and the first straight yoke section of the second yoke is provided with a mounting portion at the other end in the third direction; and the yoke cover is detachably mounted on the mounting portion to sequentially connect the first straight yoke section and the second straight yoke section of the first yoke and the first straight yoke section and the second straight yoke section of the second yoke.

4. The magnetic structure of the voice coil motor according to claim 3, wherein the first straight yoke section of the second yoke is provided with a snap-in slot at the other end in the third direction; and one end of the yoke cover is provided with a snap-in protrusion, and the snap-in protrusion is engaged in the snap-in slot; the other end of the yoke cover is configured to extend transversely to the other end of the second straight yoke section provided on the first yoke in the third direction;

wherein, the mounting portion comprises the snap-in slot.

5. The magnetic structure of the voice coil motor according to claim 4, wherein in the third direction, the other two ends of the first straight yoke section of the first yoke and the second straight yoke section of the second yoke are respectively provided with two positioning grooves; and the yoke cover is provided with two positioning posts, and the two positioning posts are configured to correspond to the two positioning grooves one by one, so that when the yoke cover is mounted on the first yoke and the second yoke, the two positioning posts are correspondingly inserted into the two positioning grooves.

6. The magnetic structure of the voice coil motor according to claim 4, further comprising:

a detachable connection structure provided with a through hole, a thread locking hole and a locking screw;

wherein a thread end of the locking screw is passed through the through hole and threadedly provided in the thread locking hole; and the through hole is provided on the yoke cover, and the thread locking hole is correspondingly provided on the other end of the second straight yoke section of the first yoke in the third direction.

7. A voice coil motor, applied to a zoom lens, comprising:

the magnetic structure of the voice coil motor according to claim 1; and an annular coil provided on a movable bearing plate of the zoom lens;

wherein the annular coil is wound along an extension axis in the third direction; the two first yoke sections of the magnetic structure of the voice coil motor that are in contact with each other in the first direction are provided in the annular coil.

8. A zoom lens, comprising the voice coil motor according to claim 7.

9. A photographic equipment, comprising the zoom lens according to claim 8.

* * * * *